(12) United States Patent
Balaberda

(10) Patent No.: US 7,035,321 B2
(45) Date of Patent: Apr. 25, 2006

(54) MONITORING STABILITY OF AN ON-FREQUENCY REPEATER

(75) Inventor: Randy Balaberda, Kanata (CA)

(73) Assignee: Spotwave Wireless Canada, Inc., Ottawa (CA)

(*) Notice: Subject to any disclaimer, the term of this patent is extended or adjusted under 35 U.S.C. 154(b) by 461 days.

(21) Appl. No.: 10/299,797

(22) Filed: Nov. 20, 2002

(65) Prior Publication Data
US 2004/0095992 A1  May 20, 2004

(51) Int. Cl.
H04B 17/02 (2006.01)

(52) U.S. Cl. ..................................... 375/213

(58) Field of Classification Search ............... 375/211, 375/214, 219, 285, 224, 345, 213; 455/7, 455/9, 10; 370/279, 243, 246; 379/338, 379/501, 492
See application file for complete search history.

(56) References Cited

U.S. PATENT DOCUMENTS

| | | | |
|---|---|---|---|
| 4,317,217 A | 2/1982 | Davidson et al. | |
| 4,383,331 A * | 5/1983 | Davidson | 455/24 |
| 4,475,234 A | 10/1984 | Nishijima et al. | 382/1 |
| 5,675,288 A * | 10/1997 | Peyrotte et al. | 330/149 |
| 5,691,978 A | 11/1997 | Kenworthy | 370/278 |
| 5,835,848 A * | 11/1998 | Bi et al. | 455/24 |
| 6,061,548 A | 5/2000 | Reudink | 455/18 |
| 6,311,045 B1 | 10/2001 | Domokos | 455/78 |
| 6,385,435 B1 | 5/2002 | Lee | 455/24 |
| 6,889,033 B1 * | 5/2005 | Bongfeldt | 455/11.1 |
| 2001/0015673 A1 * | 8/2001 | Yamashita et al. | 330/52 |
| 2002/0044594 A1 | 4/2002 | Bongfeldt | |

FOREIGN PATENT DOCUMENTS

EP  0 851 606 A2  1/1997

* cited by examiner

Primary Examiner—Tesfaldet Bocure
(74) Attorney, Agent, or Firm—Kent Daniels Ogilvy Renault, LLP

(57) ABSTRACT

A system provides evaluation of stability of an on-frequency repeater. A unique signature is imposed on RF signals transmitted by the repeater, and RF signals received by the repeater are analyzed to detect signal components corresponding to the signature. The signature signal is composed of a sequential series of signal pulses separated by a quiescent period. Respective transmit and quiescent power levels of signal components of the input signal received by the repeater are detected. These power levels are then used to estimate the system stability.

26 Claims, 3 Drawing Sheets

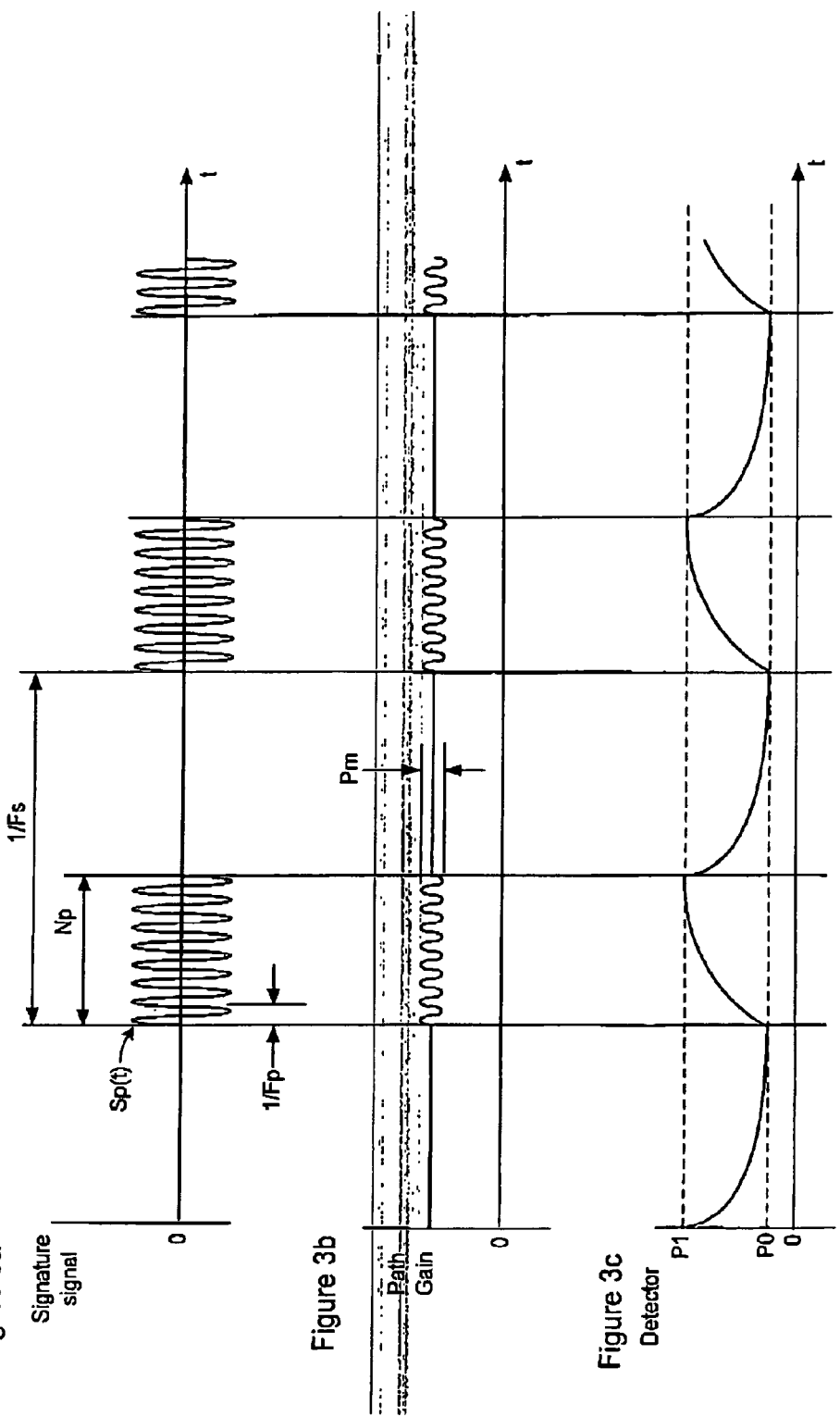

MONITORING STABILITY OF AN ON-FREQUENCY REPEATER

CROSS-REFERENCE TO RELATED APPLICATIONS

This application is the first application filed for the present invention.

MICROFICHE APPENDIX

Not Applicable.

TECHNICAL FIELD

The present application relates to wireless access networks and, in particular, to a method and system for monitoring stability of an on-frequency repeater.

BACKGROUND OF THE INVENTION

On-frequency repeaters are known in the art, for amplifying an input signal without otherwise altering its frequency spectrum. In some cases, an on-frequency repeater may also employ various types of active circuitry in order to enhance the signal-to-noise (S/N) ratio, in addition to simply increasing the power level. A typical application of on-frequency repeaters is for improving wireless services within defined regions of a wireless network, where signal levels would otherwise be too low for satisfactory quality of service. For example, within a building, or a built-up urban area, signal attenuation, shadowing by buildings and/or hills; noise generated by various radio frequency sources, and multi-path effects can seriously degrade the quality of desired RF signals. In some cases, a wireless network provider may install a repeater in order to improve service in a region lying at an edge of the coverage area serviced by a base station, thereby effectively extending the reach of the base-station.

On-frequency repeaters are characterized by the fact that the input and output signals (in either the uplink or downlink path directions) have the same frequency. For the purposes of the present invention, the term "on-frequency repeater" shall be understood to refer to any amplifier system that has this characteristic, irrespective of whether the system is used as part of an wireless communications network, or in any other context. The external input signal received by the repeater (e.g. from a base station or a subscriber's wireless communications device—WCD) can be represented by:

$$Se = A \cdot \text{Cos}(\omega t + m(t)) \quad (1)$$

Where A is the peak amplitude of the external input signal, ω is the carrier frequency and m(t) is the (frequency) modulation applied to the external input signal. In this case, the corresponding output signal radiated by the repeater can be represented by:

$$So = G \cdot A \cdot \text{Cos}(\omega(t-\delta) + m(t-\delta)) \quad (2)$$

Where G is the repeater gain and δ is the time delay through the repeater at the carrier frequency ω.

It will be seen that the output signal (So) radiated by the repeater is a replica of the input signal received by the repeater, that has been amplified and subject to a time delay δ due to electrical delays within the repeater. Part of this delay is inherent to the amplification process, but is primarily caused by band-pass filters used in the repeater to prevent the unwanted amplification of signals outside the frequency band of interest. Generally this delay is inversely proportional to the bandwidth of the filters. The repeater gain (G) provides the increase in signal level that makes the repeater useful.

A limitation of on-frequency repeaters is that the output signal (So) can feed back to the repeater input via a so-called "leakage path". This feedback signal, which is present at the repeater's input antenna, is then:

$$Sf = \left(\frac{G \cdot A}{L}\right) \cdot \text{Cos}(\omega(t - \delta - \Delta) + m(t - \delta - \Delta)) \quad (3)$$

Where L is the signal loss in the feedback path (that is, the antenna isolation), and Δ is the time delay in the feedback path at the carrier frequency ω.

It will be seen that, if the modulation rate is slow compared to $$\frac{1}{(\delta + \Delta)},$$

the feedback signal appears as a phase-shifted version of the external input signal (Se). Consequently, as long as $$\left(\frac{G \cdot A}{L}\right) \ll 1,$$

the resulting input signal (Si) received by the repeater will be the vector sum of the external input signal Se (Equ. 1) and the feedback signal Sf (Equ. 3). The magnitude of the input signal (Si) is a function of both the amplitude of the external input signal (Se) and the feedback signal Sf, and their relative phases. For a repeater system that employs automatic gain control, the magnitude of the output signal (So), and thus the feedback signal (Sf), will be held approximately constant over a wide range of input power. Such a system will remain stable if the feedback signal Sf is always smaller than the input signal (Se).

However, if the system gain (G) becomes too high, so tat Sf≧Se, then signal leakage between the output and input antennas will cause system oscillation. In principle, system stability can be obtained by ensuring that antenna isolation (L) is equal to or greater than the system gain (G). However, in practice, antenna isolation is difficult to predict, and will frequently change over time. Accordingly, conventional on-frequency repealer gain is manually adjusted by a technician to be less than the expected antenna isolation by a significant margin, in order to provide conditional stability in a changing RF environment. This margin significantly decreases the effectiveness of the repeater and yet does not prevent oscillation for all potential scenarios.

Various systems have been proposed for dynamically monitoring antenna isolation to control or prevent repeater oscillation.

For example, U.S. Pat. Nos. 5,125,108 and 5,584,065 disclose methods of removing interfering signals that are present along with a desired communications signal traffic, using a sample of the interfering signal recieved by a separate, auxiliary antenna. In these references, adaptive techniques are employed to adjust the amplitude and phase of the sample so that, when it is combined with the output of the communication system's receiving antenna, the interfering signal is cancelled.

U.S. Pat. No. 4,475,243 describes an apparatus for minimizing the "spillover" signal from the transmitter to the receiver in a repeater. In this reference, the received signal is translated to baseband (i.e., the carrier is removed) for amplification (regeneration), then translated back up to the same carrier frequency (i.e., remodulating a carrier) for retransmission. An "injection signal" based on sampling the regenerated communication signal is used in conjunction with mixing and correlation techniques to isolate the spillover component of the input signal so that it can be removed at an intermediate frequency (IF) stage of the receiver. This system is designed to handle a single communication signal with narrowband analog voice modulation, and thus is not suitable for use with broadband signal traffic carrying multiple parallel communication signals.

Furthermore, in U.S. Pat. Nos. 4,701,935 and 4,789,993, a digital microwave radio repeater is described in which the desired digital signal is a single signal and is regenerated (amplified) at baseband. In these references, the transmitter-to-receiver coupled interference component that appears at baseband is canceled by subtracting an estimated baseband interference signal. The estimated baseband interference signal is produced by means of an equalization technique implemented by transversal filters whose characteristics are adaptively determined.

U.S. Pat. No. 4,383,331 teaches a system in which a "tag", in the form of one or more side-frequencies, is added to the output signal prior to its retransmission. The detection of the tag in a received input signal allows the power level of the feed back signal to be measured, and this information allows the repeater to subtract out the interference. In principle, this technique could be applied to monitor antenna isolation in a repeater operating in a broadband RF environment. However, it suffers the limitation that the tag must be located in a side-band (i.e., lying above or below the bandwidth of the desired communications signal traffic) in order to avoid interference corrupting the desired communications signal traffic and/or interfering with other network components. Because antenna isolation can vary strongly with frequency, measurements based on side-band "tags" can, at best, provide only an rough approximation of the antenna isolation at the frequencies of the desired communications signal traffic.

U.S. Pat. No. 5,835,848, teaches a repeater in which antenna isolation is determined using a calibration procedure that is executed during periods in which no communications traffic is present. The calibration procedure involves opening a switch to prevent transmission of signals received at the input antenna; transmitting a test (pilot) signal from the output antenna; and then detecting the signal power of the test signal received through the input antenna. With this scheme, the test signal can be transmitted at any desired frequency, so it is possible to measure antenna isolation, as a function of frequency, across the entire operating bandwidth of the communications traffic. However, in order to accomplish this, there must be no communications signal traffic during the calibration procedure. This necessarily requires interruption of the communications signal traffic, which is highly undesirable.

The systems of U.S. Pat. Nos. 4,383,331 and 5,835,848 suffer the further disadvantage that, in most cases, the power level of the received test (pilot or tag) signal will be very low, requiring highly sensitive detection circuitry to successfully monitor. However, this high sensitivity renders the detection circuit vulnerable to radio frequency interference (RFI) emitted by many common electronic devices and/or test signals transmitted by other repeaters. The presence of noise at the same frequency as the test signal can easily render the system incapable of accurately detecting antenna isolation, and in fact may disable the repeater entirely.

Applicant's co-pending U.S. Pat. application Ser. No. 09/919,888 proposes a solution in which a unique bit-sequence is encoded as a signature signal that is transmitted through an output antenna as a low-level fade impressed on a broadband RE signal. The signal received through the input antenna is correlated with the bit-sequence, and the degree of correlation used as an indirect indicator of system stability. Impressing the signature signal onto the broadband RF signal (i.e., the desired communications signal traffic) as a low-level fade allows the system stability to be continuously monitored without interfering with the communications signal traffic of other devices within the network. The use of a unique bit-sequence to generate the signature signal effectively ensures that the system can readily distinguish between noise (both random RFI and test and/a signature signals from other repeaters) and its own signature signal. However, accurate correlation between the received signal and the bit-sequence is computationally intensive. In some cases, a simpler solution is desired, without sacrificing the advantages obtained by the use of a unique signature signal.

Accordingly, a method and system capable of reliably monitoring stability of an on-frequency repeater, at a moderate cost, remains highly desirable.

SUMMARY OF THE INVENTION

An object of the present invention is to provide a method and system for monitoring stability of an on-frequency repeater.

Accordingly, an aspect of the present invention provides a method of monitoring stability of an on-frequency repeater. According to the invention, a signature signal comprising a sequential series of signal pulses is generated. Each signal pulse has a selected pulse function and duration. The signature signal is transmitted through an output of the repeater. During a quiescent period between transmission of successive signal pulses, a respective quiescent power level of an input signal component received through an input of the repeater, and having a frequency corresponding to the selected pulse function, is detected. During transmission of the next successive signal pulse, a respective transmit power level of the input signal component is detected. The transmitted signature signal, and the detected quiescent and transmit power levels of the input signal component are then used to estimate stability of the repeater.

Thus the present invention utilizes a pulsed signature signal, which is detected in the input signal Si during both the transmission of signal pulses and the quiescent period between pulses. This arrangement enables the signal components corresponding to the signature signal appearing in the input signal (Si) (via the leakage path) to be positively distinguished from ambient noise having the same frequency as the signature signal. By transmitting the signature signal as a low-level amplitude modulation of the output signal (So), continuous, real-time monitoring of stability can be obtained without interfering with desired communications signal traffic. Information of the system stability can be used in various ways, such as for example, to control system gain.

BRIEF DESCRIPTION OF THE DRAWINGS

Further features and advantages of the present invention will become apparent from the following detailed description, taken in combination with the appended drawings, in which:

FIGS. 3a–3c are signal charts illustrating operation of the stability monitoring system of FIG. 1.

It will be noted that throughout the appended drawings, like features are identified by like reference numerals.

DETAILED DESCRIPTION OF THE PREFERRED EMBODIMENT

Figure 1:
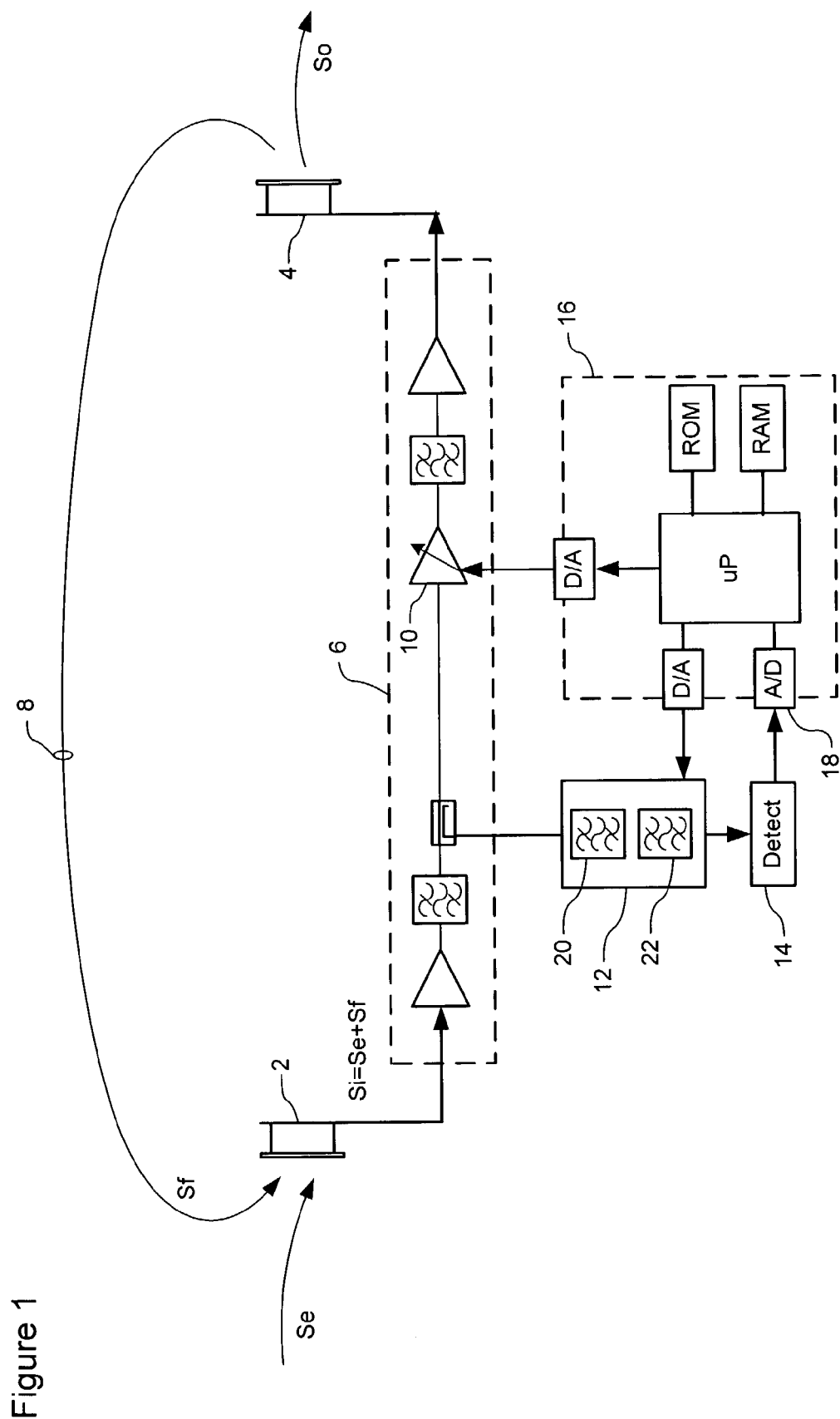
FIG. 1 is a block diagram schematically illustrating principle elements of an isolation monitoring system in accordance with an embodiment of the present invention, deployed in an on-frequency repeater.

The present invention provides a method and system for monitoring stability of an on-frequency repeater. FIG. 1 is a block illustrating principle elements of an exemplary system in accordance with an embodiment of the present invention.

As shown in FIG. 1, an on-frequency repeater includes an input 2 for receiving an input signal (Si); an output 4 for radiating an output signal (So); and a signal path 6 coupled between the input 2 and output 4 in order to amplify the received input signal (Si) for retransmission as the output signal (So). If desired, the signal path 6 may include an Intermediate Frequency (IF) section (not shown) to facilitate filtering, amplification, and other signal processing functions.

FIG. 1 shows a single RF signal path 6 coupled between the input 2 and output 4, both of which are provided by respective antennas. This arrangement will clearly be suitable for unidirectional RF signal traffic. Bi-directional signal traffic through the repeater can readily be accommodated by duplicating the system of FIG. 1, or by coupling a pair of signal paths between the two antennas via diplexers. Both of these solutions are well known in the art, and accordingly will not be described in greater detail.

In general, the bandwidth of the signal path 6 will be determined in accordance with the communications network within which the repeater will operate. For example, in North America, publicly accessible cellular communications networks utilize a 25 MHz uplink and downlink channel bandwidth centered on 836.5 MHz and 881.5 MHz, respectively.

Because the radiated output signal (So) is an amplified (and phase shifted) replica of the received input signal (Si), a feedback signal (Sf) will couple between the output 4 and the input 2 via a leakage path 8, as described above and shown in FIG. 1. Thus the received input signal (Si) will be the vector sum of the external input signal (Se) and the feedback signal (Sf). As described above, if the isolation between the output 4 and input 2 is less than the total gain of the signal path 6, then (Sf) may become greater than (Se), and unstable operation of the repeater (in the form of oscillation) will occur.

In general, the present invention operates by adding a signature signal to the output signal (So), and detecting corresponding signal components appearing in the received input signal (Si) via the leakage path 8. The signature signal is designed such that the corresponding signal components can be unambiguously discriminated from noise in the received input signal (Si). Additionally, the signature signal is added to the output signal (So) in such a manner that it does not interfere with subscriber traffic. Correlation between the signature signal added into the output signal (So) with the signal components detected within the input signal (Si) provides an indirect indication of the stability of the repeater. FIG. 1 illustrates an exemplary stability monitoring system in accordance with the present invention.

As shown in FIG. 1, the isolation monitoring system includes a modulator 10 for adding the signature signal to the output signal (So); a tunable isolator 12 coupled to the signal path 6 for isolating signal components corresponding to the transmitted signature signal appearing in the received input signal (Si); a detector 14 for detecting the isolated signal component, and a micro-controller 16 operating under suitable software control for controlling operation of the modulator and tunable detector, and for evaluating the system stability.

As will be appreciated, various means may be used to add the signature signal to the output signal (So) for transmission. In principle, either amplitude or phase modulation techniques may be used, either alone or in combination, to accomplish this function. Phase modulation has an advantage in that it is less susceptible to distortion in the leakage path 8. However, in this case, careful design is required to ensure that insertion of the signature signal does not add significant frequency-domain noise in the frequency-modulated RF signal traffic being conveyed through the signal path 6.

In the illustrated embodiment, a variable gain amplifier is used as a modulator 10 controlled by the micro-controller 16. This arrangement enables the gain of the signal path 6 to be varied in accordance with the signature signal, effectively superimposing the signature signal onto the output signal (So) as a broadband amplitude modulation. In this case, the output signal (So) radiated by the repeater can be represented by:

$$So = C(t) \cdot G \cdot A \cdot \cos(\omega(t-\delta) + m(t-\delta)) \qquad (4)$$

Where $C(t)$ is the amplitude modulation applied by the variable gain amplifier 10 in accordance with the signature signal. This amplitude modulation will also appear in the feedback signal, which can then be represented as:

$$Sf = \left(\frac{G \cdot A \cdot C(t)}{L}\right) \cdot \cos(\omega(t-\delta-\Delta) + m(t-\delta-\Delta)) \qquad (5)$$

The received input signal (Si) will include a signal component that corresponds with the amplitude modulation appearing in the feedback signal (Sf), and this signal component is isolated and detected by the tunable detector 12 and detector 14. The modulation power level of the signal component measured by the detector 14 is then sampled by a conventional analog-to-digital (A/D) converter 18, and the digitized sample value passed to micro-controller 16. Correlation between the respective power levels of the transmitted signature signal and the detected signal components within the input signal (Si) provides a direct indication of total signal leakage, and an indirect indication of system stability. Based on this information, the micro-controller 16 can implement various control functions such as, for example, controlling the gain of the signal path 6 to ensure unconditional system stability.

In principle, the signature signal may be provided as any signal pattern that can be reliably detected within the received input signal (Si), without disrupting normal operation of the repeater or other transceivers of the wireless communications network. In accordance with the present invention, the signature signal is composed as a stream of signal pulses separated by corresponding quiescent periods, as may be seen in FIG. 3a. Each signal pulse is defined by a pulse function Sp(t), which governs the waveform (shape), frequency and amplitude of the pulse. In the illustrated embodiment, the pulse function Sp(t) defines a sinusoidal waveform having a selected amplitude and pulse frequency (Fp), both of which are substantially constant values (at least during any one pulse). In principle, any pulse waveform that can be positively detected in the input signal (Si), such as, for example, square, sinusoidal, or triangular waveforms may be used. The amplitude of the pulse waveform may remain constant, or may be varied (e.g. following an amplitude modulation pattern) as desired. Similarly, the pulse frequency (Fp) of the pulse waveform can be constant or may be varied (e.g. chirped or frequency modulated). The duration (Np) of each pulse can be controlled using any or a variety of well known means, such as, for example, a desired number of cycles of the pulse waveform. Various means can be used to generate the signature signal. For example, the micro-controller 16 may be programmed to synthesize the signature signal by sequentially reading successive values from a read-only-memory (ROM). The digital values read from the ROM can then be converted to corresponding analog values by a digital-to-analog converter (D/A), the output of which is used to control the VGA 10. However, other techniques may equally be used. Any of these techniques are considered to be well within the purview of those of ordinary skill in the art, and thus will not be described further.

Correlation between the signature signal superimposed on the output signal (So) and corresponding signal components within the received input signal (Si) can be accomplished by detecting respective magnitudes of the received input signal (Si) at a frequency corresponding to the pulse function Sp(t) during a quiescent period between successive pulses, and during transmission of the next successive pulse. In embodiments in which the pulse frequency (Fp) is a constant, this can be accomplished by suitably tuning a detector to the appropriate pulse frequency (Fp). In embodiments in which the pulse frequency (Fp) varies during a pulse, the detector is tuned to follow the frequency profile of the pulse function Sp(t). In either case, the resulting measured magnitudes, in combination with the known modulation power of the signature signal within the output signal (So) enables estimation of system stability, as will be described in greater detail below with reference to FIGS. 2 and 3.

Figure 2:
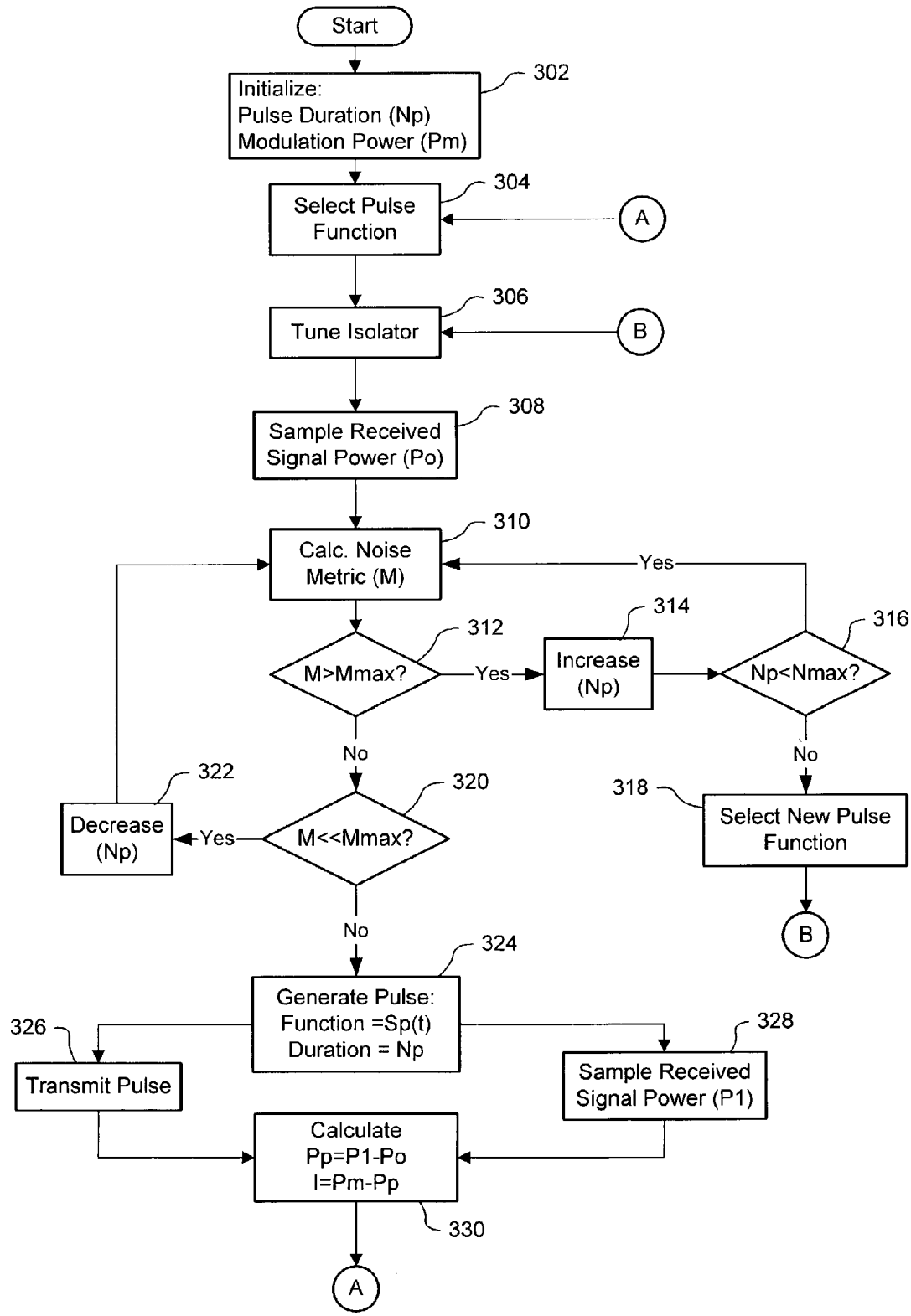
FIG. 2 is a flow-chart illustrating principle operations of the stability monitoring system of FIG. 1.

FIG. 2 is a flow chart showing principle steps in a process of estimating system stability in accordance with the present invention. As an initial step 302, the pulse duration (Np) of each pulse, and the modulation power (Pm) are initialized, and the pulse function Sp(t) (including the waveform and pulse frequency—Fp) is selected (at 304). In principle, any desired pulse frequency (Fp) may be used. However, the frequency (Fp) should be high enough to ensure that the signature signal can be detected in the input signal (Si) in a timely manner, and low enough to avoid interference with subscriber signal traffic. In environments in which multiple repeaters may be operating, selection of different pulse function parameters (principally the frequency) for each repeater can minimize the risk of faulty operation due, for example, to erroneous detection of a signature signal transmitted by another repeater.

Effective discrimination can also be obtained by the use of multiple different pulse functions. For example, parameters for a set of predetermined "candidate" pulse functions can be stored in memory. The micro-controller 16 can then select one of the candidate functions, and control generation of the signature signal using the selected function. This selection process can be "static", or "dynamic", as desired. In a static selection process, the micro-controller 16 may select a pulse function once (e.g., as part of a start-up sequence), and then use the parameters associated with that function (including the waveform, frequency etc.) thereafter. In this situation, the pulse function may be a "fixed" default value, in which case a discrete operation step of "selecting the pulse function" (step 304) may be eliminated. Dynamic selection processes can be implemented in various ways. For example, the micro-controller 16 can select each candidate function in turn, with the parameters associated with each selected candidate function being used as the pulse function for a predetermined period of time (e.g., a desired number of successive pulses). Selection of candidate functions can follow a predetermined order, or be random, as desired. In either case, the use of multiple candidate functions reduces the probability that two neighboring repeaters will be simultaneously using the same pulse function. As will be appreciated, this effectively eliminates the risk that a repeater will erroneously estimate system stability based on a signature signal transmitted by a neighbor repeater.

Once the pulse function has been selected, the isolator 12 is tuned (at 306) to facilitate detection of the signal (or modulation) power within a narrow-band centered on the pulse frequency (Fp). In a simple embodiment, this can be accomplished using a tunable narrow band-pass filter tuned to the pulse frequency (Fp) of the selected pulse function. Preferably, however, a pair of cascaded tunable filters 20,22 are used, as shown in FIG. 1. In this case, a first tunable filter 20 is tunable across the entire frequency band of the signal path 6, and thus can be used to select a desired narrow band channel within the signal path 6. The second filter 22 is then tuned to the pulse frequency (Fp), in order to isolate a signal component that corresponds to the signature signal within the selected narrow band channel. This latter arrangement is advantageous in that the first filter 20 can be used to scan across the frequency band of the signal path 6, so that stability can be monitored as a function of frequency. If desired, this functionality can also be exploited to improve system performance, by tuning the first filter 20 to the narrow-band channel for which the system stability is a minimum.

Once the isolator 12 has been tuned to the pulse frequency (Fp), the power level measured by the detector 14 is sampled (at 308). Because this power level measurement is sampled during a quiescent period (initially, before transmission of the first pulse, and thereafter between successive pulses) it may be referred to as the "quiescent" power level (Po), and is directly indicative of the level of ambient noise, at the selected pulse frequency (Fp) within the input signal Si. This value can be used to calculate a noise metric (M) at 310. In simple embodiments, the noise metric (M) may simply be the quiescent power (Po) level itself. In other embodiments, the noise metric (M) may be a calculated parameter that also takes into account the known characteristics of the system (e.g., phase delay, signal gain, filter characteristics, detector sensitivity, A/D precision etc.) as well as the waveform, frequency (Fp) and duration (Np) of each signal pulse. As a simple example, consider a noise metric (M) calculated using an equation of the form:

$$M = \frac{Po}{Np} \tag{6}$$

in which the pulse duration Np is counted as the number of cycles of each pulse. This formulation reflects the fact that the noise tolerance of the system improves with pulse duration. Clearly, other equations may be used as desired. Development of a suitable noise metric equation is considered to be well within the perview of one of ordinary skill in the art, and thus will not be described in further detail. As will be appreciated, the use of a calculated noise metric (as opposed to simply using the quiescent power level Po) offers an advantage in that the noise metric (M) can then be directly indicative of the ability of the system to accurately evaluate system stability under the current conditions of ambient noise, using the selected pulse function.

As is well known in the art, ambient noise can vary dramatically with location and time. In an ideal situation, ambient noise will be minimal, and thus the detected quiescent power (Po) will be close to zero. However, in practice, this will frequently not be the case, particularly if multiple noise sources are present. If the ambient noise level is too high, then accurate detection and sampling of signal components corresponding to a subsequently transmitted pulse, and consequently accurate estimation of stability, will not be possible.

Accordingly, the noise metric (M) is compared to a threshold level (Mmax) at 312 that represents the maximum tolerable ambient noise level. If the noise metric (M) is greater than the threshold level (Mmax), then the duration (Np) of each pulse can be increased (at 314) to improve detection performance. However, increasing the duration (Np) has the effect of reducing system responsiveness, by reducing the rate at which successive pulses can be transmitted. At some point, the increased sensitivity afforded by increasing the duration of each pulse is offset by the degraded system response time.

Accordingly, the pulse duration (Np) is then compared (at 316) with a predetermined maximum permissible pulse length (Nmax). If Np is greater than Nmax, then it is assumed that the ambient noise level is too high to permit satisfactory estimation of stability using the current pulse function. In this case, the current pulse function is discarded in favor of a new function (e.g. having a different pulse frequency—Fp) (at 318); and processing continues from step 306 above.

This process of selecting, testing and discarding pulse functions (304–318) can continue until any desired exit condition is satisfied. Example exit conditions include, but are not limited to: a pulse function is found for which M<Mmax; or it is determined that there is no pulse function for which M<Mmax. If a satisfactory pulse function is found (i.e., M<Mmax), operation of the system can continue using the new function. Otherwise, ambient noise is assumed to be too severe to permit accurate monitoring of system stability, and the system may enter a "recovery" mode (not shown), in which the total gain of signal paths is restricted to a predetermined level in order to provide unconditional stability. Thereafter, the system can continue selection of pulse function 304; detection of the quiescent power level (Po) 308; calculation of the noise metric M 310; and comparison with Mmax 312 until a pulse function is found for which M<Mmax. When this occurs, normal operation of the system can continue, as described below.

In cases where M is found to be significantly lower than Mmax (at 320), then it is possible to improve system responsiveness without unduly sacrificing detection sensitivity. This can be accomplished by decreasing the pulse duration (Np), as shown at step 322 in FIG. 2.

Once the pulse function and duration (Np) have been determined, a corresponding signal pulse of the signature signal can be generated (at 324) and inserted into the signal path 6. As described above, the signal pulse is superimposed onto the RF signal traffic in the signal path 6 as an amplitude modulation across the entire operating bandwidth of the signal path 6. For example, in the embodiment of FIG. 1 the signature signal is used as an variable gain amplifier control signal to modulate the gain of the signal path 6. In order to avoid disturbing the performance of wireless devices receiving the output signal (So) radiated by the output 4, the modulation power (Pm) of the signal pulse is preferably held to a low level (e.g., less than about 3dB).

As may be seen in FIG. 3c, during transmission of the signal pulse (326), the power level detected by the tunable detector (at 328) will increase to a so-called "transmit" power level (Pi), as signal components corresponding to the pulse feed back to the input 2; appear in the received input signal (Si); and are detected and integrated by the isolator 12, detector 14 and A/D converter 18. The transmit power value (P1) detected at step 328 represents the vector sum of ambient noise (Po) and the pulse within the feedback signal (Sf). Thus the modulation power level (Pp) of the signal components corresponding to the pulse within the received input signal Si can be determined as Pp=P1−Po, and the system stability (I) estimated as I=Pm−Pp.

The embodiments of the invention described above are intended to be exemplary only. The scope of the invention is therefore intended to be limited solely by the scope of the appended claims.

I claim:

1. A method of monitoring stability of an on-frequency repeater, the method comprising steps of:
   generating a signature signal comprising a sequential series of signal pulses, each signal pulse having a selected pulse function;
   transmitting the signature signal through an output of the amplifier;
   detecting, during a quiescent period between transmission of successive signal pulses, a respective quiescent power level of an input signal component received through an input of the amplifier and having a frequency corresponding to the selected pulse function;
   detecting a respective transmit power level of the input signal component during transmission of the next successive signal pulse; and
   estimating the repeater stability using at least the transmitted signature signal and the detected quiescent and transmit power levels of the input signal component.

2. A method as claimed in claim 1, wherein the step of generating the signature signal comprises a step of selecting a pulse duration.

3. A method as claimed in claim 2, wherein the step of selecting a pulse duration comprises steps of:
   calculating a noise metric;
   comparing the calculated noise metric to a predetermined threshold noise value; and
   adjusting a number of cycles of each pulse based on the comparison result.

4. A method as claimed in claim 3, wherein the step of calculating a noise metric comprises a step of using the detected quiescent power level as the noise metric.

5. A method as claimed in claim 3, wherein the step of calculating a noise metric comprises a step of calculating a noise metric parameter as a function of at least the detected quiescent power level and the pulse duration.

6. A method as claimed in claim 2, wherein the step of generating the signature signal further comprises a step of selecting the pulse function from among a plurality of predetermined candidate functions.

7. A method as claimed in claim 6, wherein the selected candidate function is used as the pulse function of a set of one or more successive signal pulses.

8. A method as claimed in claim 7, wherein the step of selecting the pulse function is repeated for each successive set of signal pulses.

9. A method as claimed in claim 8, wherein each successive function is selected from the set of predetermined candidate functions in accordance with a predetermined selection order.

10. A method as claimed in claim 6, wherein the step of selecting the pulse function comprises further steps of:
    detecting whether excessive noise is present at a frequency corresponding to the selected pulse function; and
    if excessive noise is detected, selecting another pulse function.

11. A method as claimed in claim 10, wherein the step of detecting whether excessive noise is present comprises a step of comparing the pulse duration with a predetermined maximum permissible pulse duration.

12. A method as claimed in claim 1, wherein the step of transmitting the signature signal comprises a step of adding the signature signal to a broadband RF signal path coupled to the output of the repeater.

13. A method as claimed in claim 12, wherein the step of adding the signature signal to a broadband RF signal path comprises a step of using the signature signal to modulate any one or more of:
    a gain of the broadband RF signal path; and
    a phase delay of the broadband RF signal path.

14. A method as claimed in claim 1, wherein the step of estimating the repeater stability comprises steps of:
    calculating a difference between the detected quiescent and transmit power levels; and
    comparing the calculated difference to a transmitted power level of the respective signal pulse.

15. A method as claimed in claim 14, wherein the step of estimating the repeater stability is repeated for each one of a set of two or more successive signal pulses.

16. A method as claimed in claim 15, further comprising a step of averaging two or more successive estimates of the repeater stability.

17. A system for monitoring stability of an on-frequency repeater, the system comprising:
    a signal generator adapted to generate a signature signal comprising a sequential series of signal pulses, each signal pulse having a selected pulse function;
    a modulator for transmitting the signature signal through an output of the amplifier;
    a tunable detector adapted to detect a power level of an input signal component received through an input of the amplifier and having a frequency corresponding to the selected pulse function, the tunable detector being operative during a quiescent period between transmission of successive signal pulses to detect a respective quiescent power level, and being further operative during transmission of the next successive signal pulse to detect a respective transmit power level of the input signal component; and
    a micro-controller adapted to estimate the stability using at least the transmitted signature signal and the detected quiescent and transmit power levels of the input signal component.

18. A system as claimed in claim 17, wherein the signal generator comprises a memory for storing at least a pulse duration of the signature signal.

19. A system as claimed in claim 18, wherein the pulse duration comprises a selected number of cycles within each pulse, the signal generator being operative under software control to:
    calculate a noise metric;
    compare the calculated noise metric to a predetermined threshold noise value; and
    adjust the number of cycles based on the comparison result.

20. A system as claimed in claim 18, wherein the signal generator is operative to select the pulse function from among a plurality of predetermined candidate functions.

21. A system as claimed in claim 20, wherein the selected candidate function is used as the pulse function of a set of one or more successive signal pulses.

22. A system as claimed in claim 21, wherein a different pulse function is selected for each successive set of signal pulses.

23. A system as claimed in claim 20, wherein the signal generator is further operative to:
    detect whether excessive noise is present; and
    if excessive noise is detected, select another pulse function.

24. A system as claimed in claim 17, wherein the modulator comprises a variable gain amplifier coupled to broadband RF signal path, the variable gain amplifier being controlled by the signature signal to modulate a gain of the broadband RF signal path.

25. A system as claimed in claim 17, wherein the modulator comprises a phase modulator coupled to broadband RF signal path, the phase modulator being controlled by the signature signal to modulate a phase delay of the broadband RF signal path.

26. A system as claimed in claim 17, wherein the micro-controller is operative to:
    calculate a difference between the detected quiescent and transmit power levels; and
    estimate the stability by comparing the calculated difference to a transmitted power level of the respective signal pulse.

* * * * *